(12) United States Patent
Han

(10) Patent No.: US 7,565,523 B2
(45) Date of Patent: Jul. 21, 2009

(54) APPARATUS AND METHOD FOR RESTORING MASTER BOOT RECORD INFECTED WITH VIRUS

(75) Inventor: Kyu-in Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 461 days.

(21) Appl. No.: 11/402,991

(22) Filed: Apr. 13, 2006

(65) Prior Publication Data
US 2006/0236399 A1 Oct. 19, 2006

(30) Foreign Application Priority Data
Apr. 15, 2005 (KR) ........................ 10-2005-0031622

(51) Int. Cl.
*G06F 15/177* (2006.01)
(52) U.S. Cl. ................. 713/2; 713/1; 713/188; 714/25; 714/38; 726/24
(58) Field of Classification Search ................ 713/1, 713/2, 188; 714/25, 38; 726/24
See application file for complete search history.

(56) References Cited

U.S. PATENT DOCUMENTS

| 5,701,477 | A | * | 12/1997 | Chejlava, Jr. ............... 713/2 |
| 5,802,277 | A | | 9/1998 | Cowlard |
| 6,415,382 | B1 | * | 7/2002 | Kwan ............................ 713/2 |
| 6,802,028 | B1 | * | 10/2004 | Ruff et al. ................... 714/38 |
| 6,862,681 | B2 | * | 3/2005 | Cheston et al. ............... 713/2 |
| 2002/0026571 | A1 | | 2/2002 | Rickey |
| 2002/0166059 | A1 | | 11/2002 | Rickey et al. |
| 2005/0066145 | A1 | * | 3/2005 | Han et al. .................... 711/173 |
| 2006/0212649 | A1 | * | 9/2006 | Roberts ....................... 711/112 |

FOREIGN PATENT DOCUMENTS

KR 2002-7090 1/2002

OTHER PUBLICATIONS

Office Action issued in Korean Patent Application No. 2005-0031622 on Jul. 26, 2006.

* cited by examiner

*Primary Examiner*—Abdelmoniem Elamin
(74) *Attorney, Agent, or Firm*—Stein McEwen, LLP

(57) ABSTRACT

An apparatus for and a method of restoring a master boot record infected with a virus. The apparatus comprises a first storage unit storing a master boot record (MBR), and a virus check unit searching the storage position of the MBR within the first storage unit, to determine whether the MBR is infected with the virus, and if the MBR is infected, to restore the MBR.

31 Claims, 7 Drawing Sheets

00000150: 67 20 6F 70 65 72 61 74 - 69 6E 67 20 73 79 73 74    g operating syst
00000160: 65 6D 00 4D 69 73 73 69 - 6E 67 20 6F 70 65 72 61    em.Missing opera
00000170: 74 69 6E 67 20 73 79 73 - 74 65 6D 00 00 00 00 00    ting system.....
00000180: 00 00 00 00 00 00 00 00 - 00 00 00 00 00 00 00 00    ................
```
~ 10

```
00000000: B8 00 50 8E 00 BC FF FF - 33 C0 8E D8 8E C0 BF 00    ..P.....3.......
00000010: 06 BE 00 7C B9 00 02 F3 - A4 6A 60 68 1F 00 CB B8    ...|.....j`h_...
00000020: 00 F0 8E C0 B9 00 40 BF - 00 00 66 B8 24 46 53 58    ......@...f.$FSX
00000030: F2 66 AF 83 F9 00 74 06 - B8 00 00 50 EB 67 B8 40    .f....t....P.g.@
00000040: 00 8E C0 26 8B 1E 0E 00 - 8E C3 26 8B 0E 00 00 C1    ...&......&.....
00000050: E1 08 BF 00 00 66 B8 24 - 46 45 4D F2 66 AF 83 F9    .....f.$FEM.f...
....           ....            ....                           ....

| ADDRESS | CODE | RESULT OF INVERSE ASSEMBLE | |
|---|---|---|---|
| 217E:011F | B800F0 | MOV | AX,0F000h |
| 217E:0122 | 8EC0 | MOV | ES,AX |
| 217E:0124 | B90040 | MOV | CX,4000h |
| 217E:0127 | BF0000 | MOV | DI,0000h |
| 217E:012A | 66B824465358 | MOV | EAX,58534624h |
| ... | ... | ... | ... |
| 217E:0161 | 7408 | JZ | Short 016B |
| 217E:0163 | 83EF04 | SUB | DI,04h |
| 217E:0166 | BE0200 | MOV | SI,0002h |
| 217E:0169 | EB03 | JMP | Short 016E |
| 217E:016B | BE0000 | MOV | SI,0000h |
| 217E:016E | 33C0 | XOR | AX,AX |
| 217E:0170 | 8EC0 | MOV | ES,AX |
| 217E:0172 | BB0008 | MOV | BX,0800h |
| 217E:0175 | B600 | MOV | DH,00h |
| 217E:0177 | B280 | MOV | DL,80h |
| 217E:0179 | B90C00 | MOV | CX,000Ch |
| 217E:017C | B80102 | MOV | AX,0201h |
| 217E:017F | CD13 | INT | 13h |

25, 28

APPARATUS AND METHOD FOR RESTORING MASTER BOOT RECORD INFECTED WITH VIRUS

CROSS-REFERENCE TO RELATED APPLICATIONS

This application claims the benefit of Korean Application No. 2005-31622, filed Apr. 15, 2005, in the Korean Intellectual Property Office, the disclosure of which is incorporated herein by reference.

BACKGROUND OF THE INVENTION

1. Field of the Invention

Aspects of the present invention relate to protection of a master boot record from computer viruses, and more particularly, to an apparatus for and a method of determining whether a master boot record stored in an alternate position is infected with a virus, and if infected, restoring the master boot record.

2. Description of the Related Art

Processes of a computer system begin to be executed once the computer is powered on. There are mainly two processes: Power-On Self-Test (POST) and Booting. The POST process is the diagnostic testing sequence that a computer's basic input/output system (BIOS) runs to determine if the computer keyboard, random access memory (RAM), disk drives, and other hardware are working correctly. The BIOS determines whether the system is initialized normally through the POST process. If the necessary hardware is detected and found to be operating properly, the computer begins to boot. If the hardware is not detected or is found not to be operating properly, the BIOS issues an error message on a display screen and a series of electronic beeps. An error found in the POST is usually fatal and will halt the booting process.

As the computer proceeds to the booting process, the computer reads out data stored in a master boot record (MBR) to begin the booting process. In the past, the MBR was stored in a hard disk or in a first sector (sector 1) of a diskette. The MBR is the information that identifies where an operating system is located in order to allow the operating system to be loaded into the computer's main storage. The MBR is also sometimes called a "partition sector" or a "master partition table" because the MBR includes information about a location of each partition of the hard disk. In addition, the MBR also includes a program that reads the boot sector record of the partition containing the operating system to be loaded into RAM. In turn, that record contains a program that loads the rest of the operating system into RAM.

However, cases where the MBR is not stored in the first sector of the hard disk or diskette have gradually increased. In some systems, the MBR is now located in spaces other than sector 1, and only the partition table is located in sector 1, whereby the system can execute other processes, excluding a proper booting process. The partition table can be located either in sector 1 or an alternate location.

For example, as check processes required to drive a computer are increasing, the computer maker (or vendor) independently sets the check processes or proper processes that should be executed before booting the computer, stores such processes in sector 1, and stores the MBR in a different sector. In addition, the user who purchases the computer can change the locations of the stored processes and MBR.

FIG. 1 illustrates a conventional MBR stored in a sector different from sector 1. A hard disk 310 is divided into sectors. Other data is stored in the first sector (sector 1). This other data may include items to be checked or processes to be set before booting. As shown in FIG. 1, the MBR is stored in sector 8 in order to execute the booting. Data stored in sector 1 is code to execute functions set previously by the computer maker before booting, and the code stored in sector 1 may be different for each computer manufacturer. That is, data to execute predetermined functions set by the computer manufacturer may be stored. After implementing the manufacturer peculiar functions, booting is executed by reading out the MBR. Initially, the computer reads out the first sector of the hard disk or diskette, in which data required for initialization of the system can be stored. In the past, the MBR was stored in the sector 1. But, recently data for other necessary processes for initialization and information on the sector where the MBR is stored is stored in the sector 1. As a result, the system jumps to the MBR-stored sector and executes the booting after initialization.

FIG. 2 illustrates a configuration of an MBR code. The MBR code searches for an active partition table, among partition tables, and jumps to a first portion of the concerned partition. Then, the central processing unit (CPU) executes functions by executing the code at the first portion of the concerned partition.

Conventional antivirus programs check the first sector in order to determine whether the computer is infected with a boot virus. If any virus-like code is found to exist in the first sector, the virus is treated. Accordingly, in the conventional system, it is sufficient to check if the MBR in the first sector has been modified since the MBR was stored. However, if the MBR resides in a different sector, a virus existing in the sector where the MBR is located may not be checked and treated since only the first sector is checked. Thus, when the MBR is stored in another sector, it may not be possible to find and remove the virus.

FIG. 3 illustrates checking and treating viruses according to a conventional method. First, the code of sector 1 is inspected at operation S1. When the code is MBR code, a virus check is conducted on the MBR code at operation S3. When the code is not MBR code, the virus check is terminated at operation S2. If a virus is found in the MBR code at operation S5, the virus is removed at operation S6. When there is no virus, the check is finished at operation S5. U.S. Patent Application Publication (USPAP)2002-0166059 discloses a method whereby an MBR is stored in a storage medium in order to protect boot sectors from a virus. A value of the MBR stored in the storage medium is compared with an MBR stored in a mass storage device, and when an error is detected, the MBR of the mass storage device is restored to the MBR of the storage medium. However, the method disclosed in is not directed to checking the MBR in a different position, and thus, the method disclosed in USPAP 2002-0166059 cannot detect a virus in the MBR when the MBR is in a different position.

Accordingly, a method for detecting and removing a virus from boot sector with respect to a computer whose MBR is not in the first sector is needed.

SUMMARY OF THE INVENTION

An aspect of the present invention is to check and treat virus infection when the MBR is stored in a position other than sector 1 of a disk from which a computer is to be booted.

According to an aspect of the present invention, there is provided an apparatus comprising a first storage unit storing a master boot record (MBR), and a virus check unit searching the storage position of the MBR within the first storage unit, to determine whether the MBR is infected with a virus and, if the MBR is infected, to restore the MBR.

According to an aspect of the present invention, a method of determining whether a master boot record (MBR) in an alternate position is infected with a virus and restoring the MBR comprises searching a position of the MBR stored in a predetermined first storage unit, determining whether the MBR in the searched position is infected with the virus, and restoring the MBR if the MBR is infected with the virus.

According to an aspect of the present invention, there is provided a recording medium to record a computer readable program to execute a method comprising searching a position of a master boot record stored (MBR) in a predetermined first storage unit, determining whether the MBR in the searched position is infected with a virus, and restoring the MBR if the MBR is infected with the virus.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 7 illustrates the case where the code stored in sector 1 differs by maker; and FIG. 8 illustrates assembly language code of sector 1, produced by inversely assembling the code when the MBR code is stored in a different sector.

DETAILED DESCRIPTION OF THE EMBODIMENTS

Figure 1:
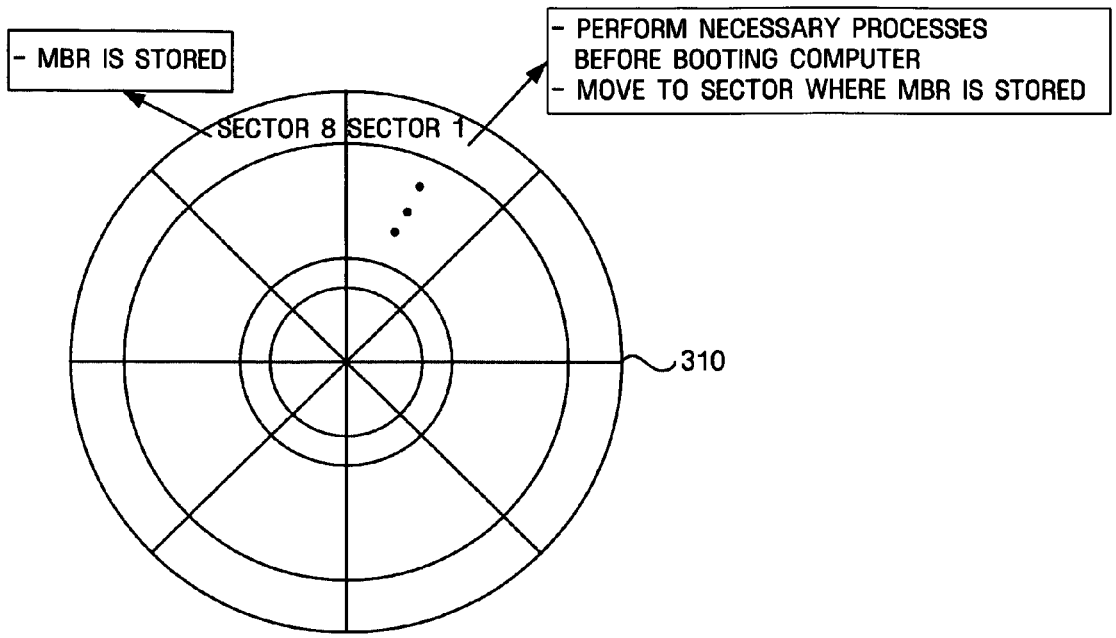
FIG. 1 illustrates a conventional MBR stored in a sector other than sector 1.
Figure 2:
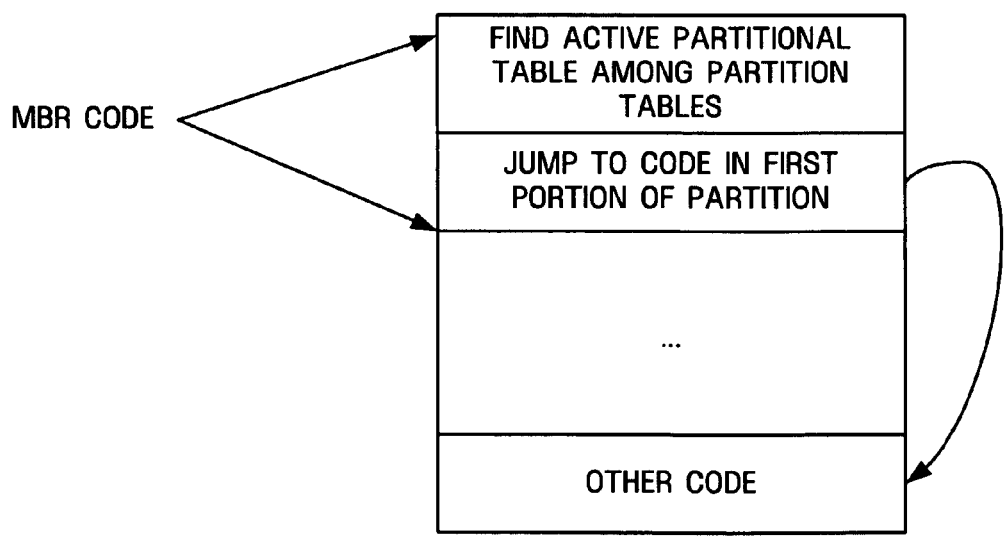
FIG. 2 illustrates a configuration of MBR code.
Figure 3:
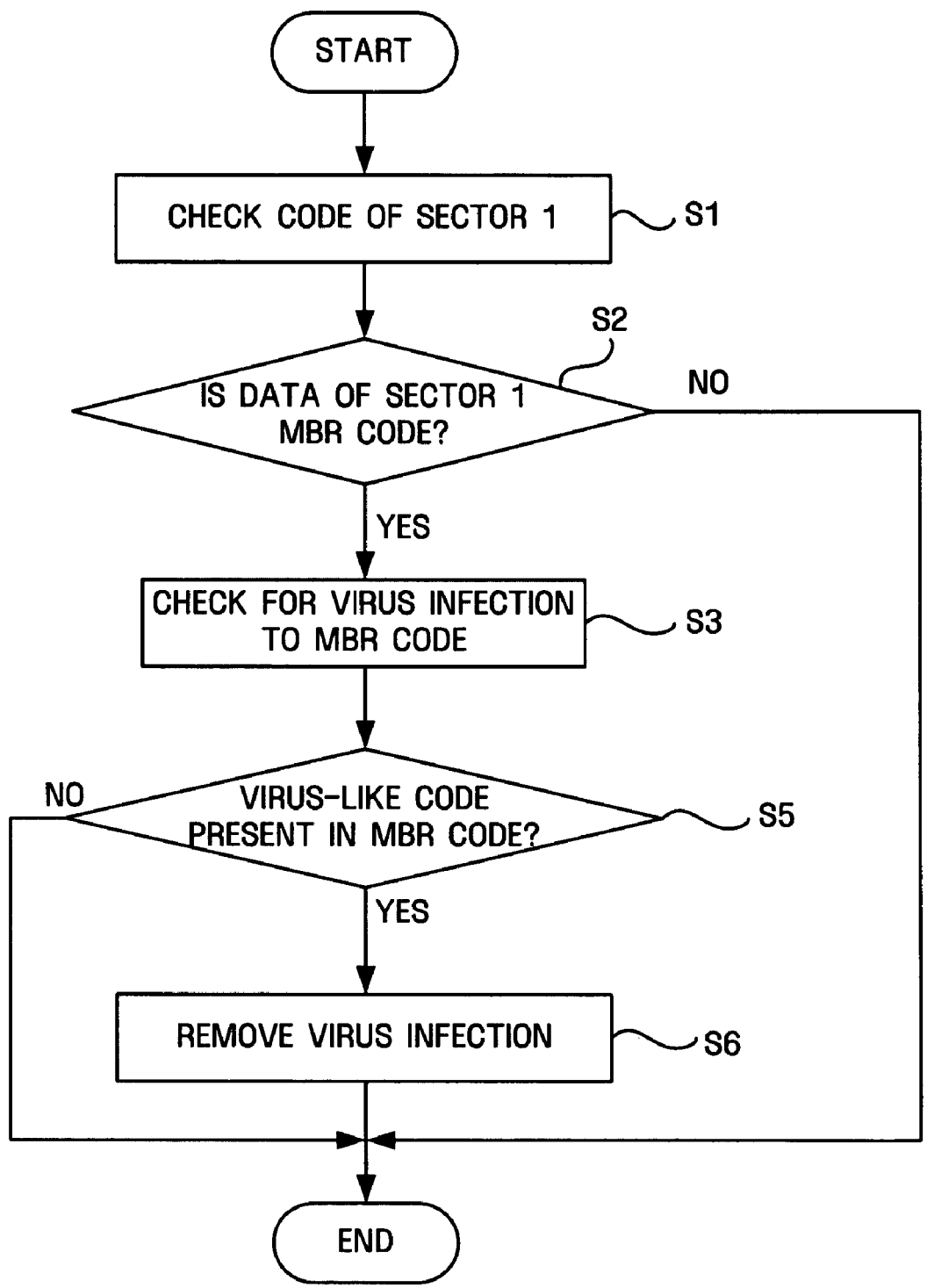
FIG. 3 is a flow chart illustrating the detection and removal of a virus according to a conventional method.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 4:
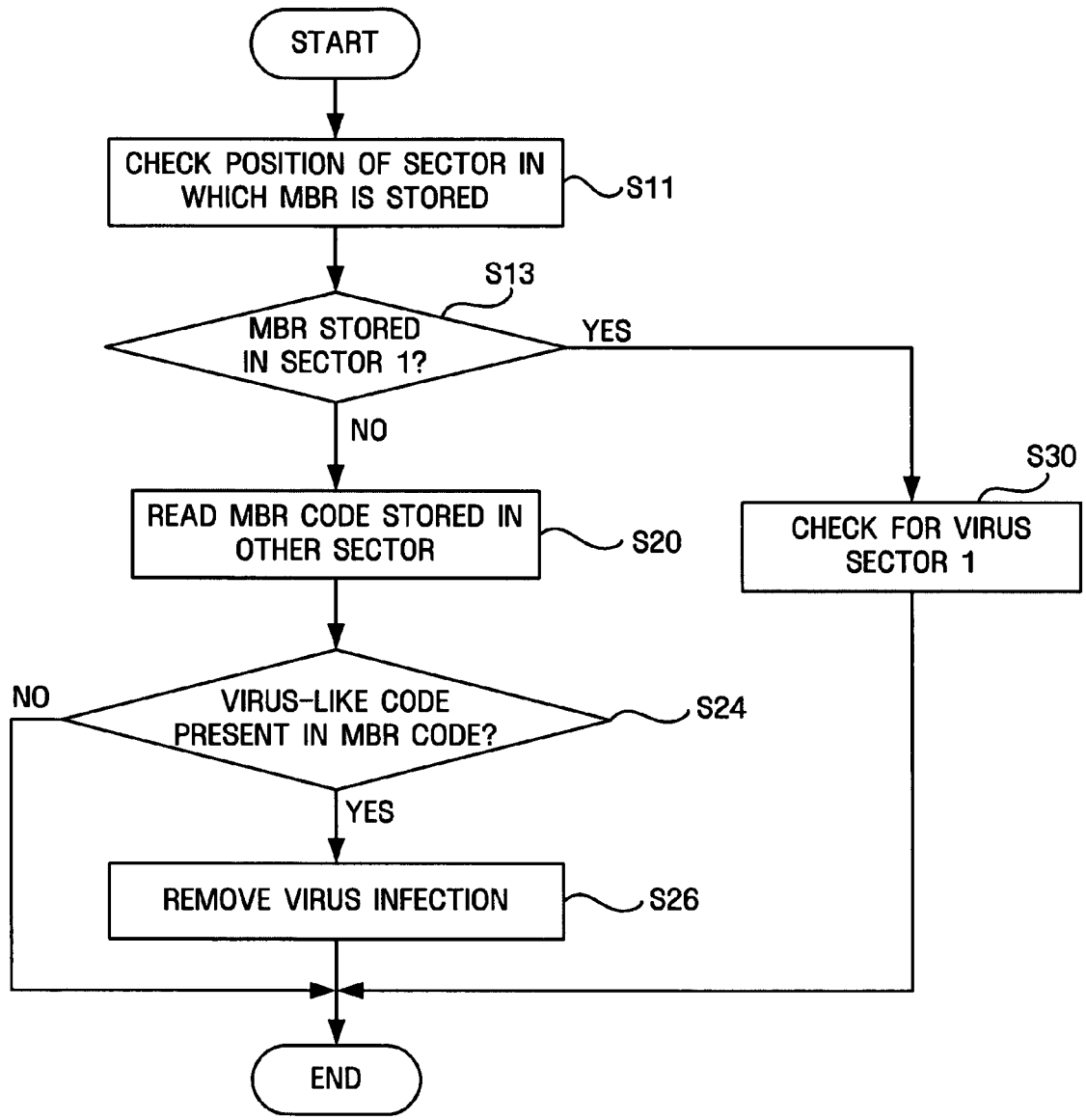
FIG. 4 is a flow chart illustrating checking a boot sector for a virus according to an embodiment of the present invention.

FIG. 4 is a flow chart illustrating checking a boot sector for a virus according to an embodiment of the present invention. A virus check program checks a position of a sector where the MBR is stored in operation S11. The sector position may be determined by checking whether a main code used in the MBR is present, or reading sector information on a location of the MBR from a complementary metal-oxide-semiconductor (CMOS) storage or a hard disk. Various methods to determine the position of the MBR are described below. When it is determined at operation S13 that the MBR is stored in sector 1, the antivirus program applies a conventional virus detection and removal method at operation S30. When is it determined at operation S13 that the MBR is not stored in sector 1, the MBR code is read by referencing position information stored in sector 1 or the CMOS storage at operation S20. If a virus is present in the MBR code at operation S24, the virus is removed at operation S26. However, if the virus is not present in the MBR code at operation S24, the virus check program finishes the virus checking and other processes are performed.

As shown in FIG. 4, when the MBR position is stored in a storage space such as a CMOS storage, the code of the concerned MBR is checked in the course of booting the BIOS; and when the MBR is infected with a virus, the MBR may be overwritten, as described below with respect to FIG. 5.

Figure 5:
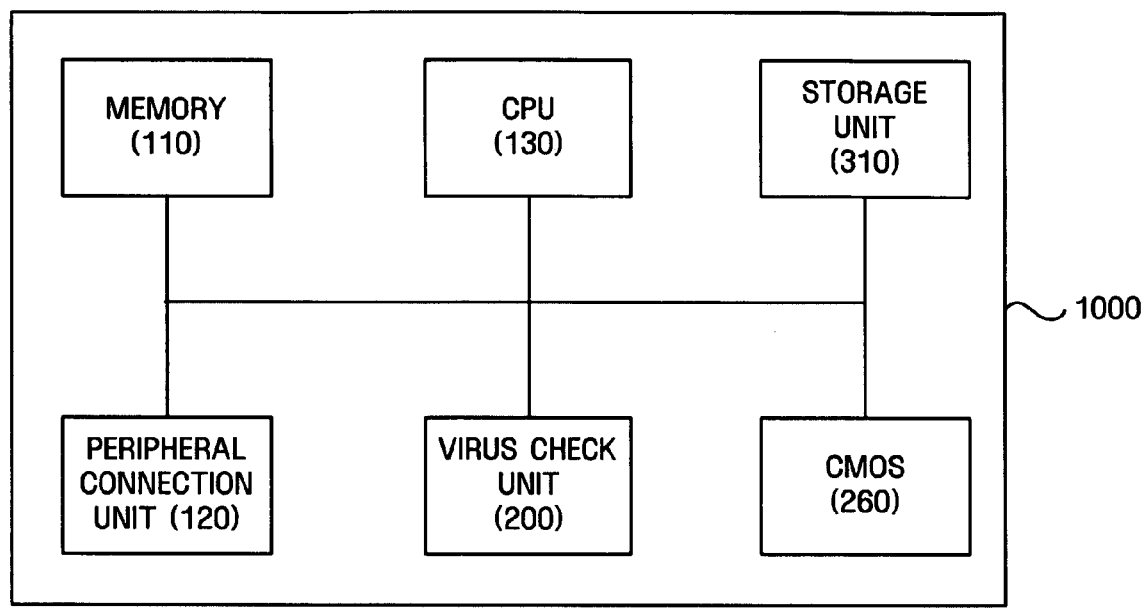
FIG. 5 is a block diagram illustrating an apparatus for checking for a virus when the MBR is stored in a location other than sector 1 according to an embodiment of the present invention.

FIG. 5 is a block diagram illustrating a virus checking apparatus used when the MBR is stored in a location other than sector 1 according to an embodiment of the present invention.

In the embodiment described below, a "part" or a "module" indicates a software component or a hardware component such as a field-programmable gate array (FPGA) or an application-specific integrated circuit (ASIC). The module resides in an addressable storage medium or the module may be configured to execute on one or more processors. Accordingly, modules may include components such as software components, object-oriented software components, class components, task components, processes, functions, attributes, procedures, subroutines, segments of program code, drivers, firmware, microcode, circuits, data, databases, data structures, tables, arrays, and parameters. Components and features provided by the modules may be combined into a smaller number of components and modules, or they may be divided into a greater number of components and modules. In addition, components and modules may be implemented to execute on one or more central processing units (CPUs) in a device.

A configuration 1000 of a currently available computer or a notebook computer is schematically illustrated in FIG. 5. Such devices have operating systems stored in a hard disk and are subject to being infected with viruses because the devices receive data from external sources. Other examples of such a device include personal digital assistants (PDAs), and handheld personal computers (HPCs).

The configuration shown in FIG. 5 comprises a CPU 130, a memory 110, a storage unit 310, a peripheral connection unit 120, a virus check unit 200, a CMOS storage 260, and a data or control bus (not numbered and illustrated as linking lines in FIG. 5) to exchange data between the CPU 130 and the linked devices. The memory 110 stores operation results of the CPU 130 or commands necessary for executing applications. The peripheral connection unit 120 exchanges data with other devices connected to the computer, such as a mouse, a keyboard, a CD-ROM and/or a display. The storage unit 310 is a non-volatile storage unit 310 and stores data. The CMOS storage 260 stores a BIOS and settings necessary when the computer is booted. The virus check unit 200 checks for viruses.

The peripheral connection unit 120, which includes a local area network (LAN) card, is a module providing connections to exchange data with external sources. The LAN card enables data to be exchanged through a network. The peripheral connection unit 120 also provides necessary functions for receiving data from outside the computer.

The CPU 130 is a module that can function to control computers or notebook computers, and to process information. A volatile memory such as random access memory (RAM), dynamic random access memory (DRAM), synchronous dynamic access memory (SDRAM), and the like may be used for the memory 110. However, a variety of memory modules including ferroelectric random access memory (FRAM), non-volatile random access memory (NVRAM), and others may be used.

The storage unit 310 may be a non-volatile storage such as a hard disk or a flash memory, in which applications and data to use computers or notebook computers are stored, and the stored data is maintained even though power is not supplied. An operating system stored in the storage unit 310 is booted. The MBR read out in the course of booting the computer is stored in the storage unit 310. As described above, the MBR provides information on the position of the operating system stored in the storage unit 310. When the storage unit 310 is divided into several sectors, information on the sectors is also provided, thereby enabling access to the data within the storage unit 310. In the embodiments described herein, such information is referred to a "master boot record" (MBR), but the embodiments are not limited by such reference. The embodiments of the present invention are directed to checking whether a space storing information required when a computer is booted is infected with viruses. Information for performing the same functions, but which has a name other than MBR, may serve to check for a virus.

The CMOS storage 260 stores information for initial settings of a computer or information necessary when the BIOS is actuated. As an example, to store the storage position of the MBR, the number of the sector storing the MBR may be stored in the CMOS storage 260. However, this information may also be stored in the storage unit 310. The virus check unit 200 refers to a program to detect and remove a virus, and comprises a storage medium in which the program is installed. The virus check unit 200 may execute the virus check program via a network through communication means such as a floppy disk, a hard drive, a CD-ROM drive and a LAN, which is connected to the peripheral connection unit 120.

When the BIOS checks for a virus, the BIOS may comprise the virus check unit 200. The storage position of the MBR is set in the BIOS when the system is manufactured. When the storage position of the MBR is pre-stored in a specific storage space (CMOS or storage unit), the BIOS reads out the MBR code of the concerned position when the system is booted. When a virus is present, the BIOS can restore the pre-stored original MBR code. The identical code relative to the system is provided as the MBR code. Overwriting the code does not adversely affect the system.

Referring again to FIG. 4, when the position of the sector, in which the MBR is stored, is determined to be stored in the CMOS storage 260 in operation S11, the virus check unit 200 acquires the position information from the CMOS storage 260 when the system is booted and proceeds to check for a virus. The position of the MBR is stored in the same module as the CMOS storage 260.

The CMOS storage 260 shown in FIG. 5 stores the position of the MBR, for example. However, the position of the MBR may be stored in a specific portion of the mass storage unit 310. The position information of the MBR may also be stored in a device or module that stores other settings.

Figure 6:
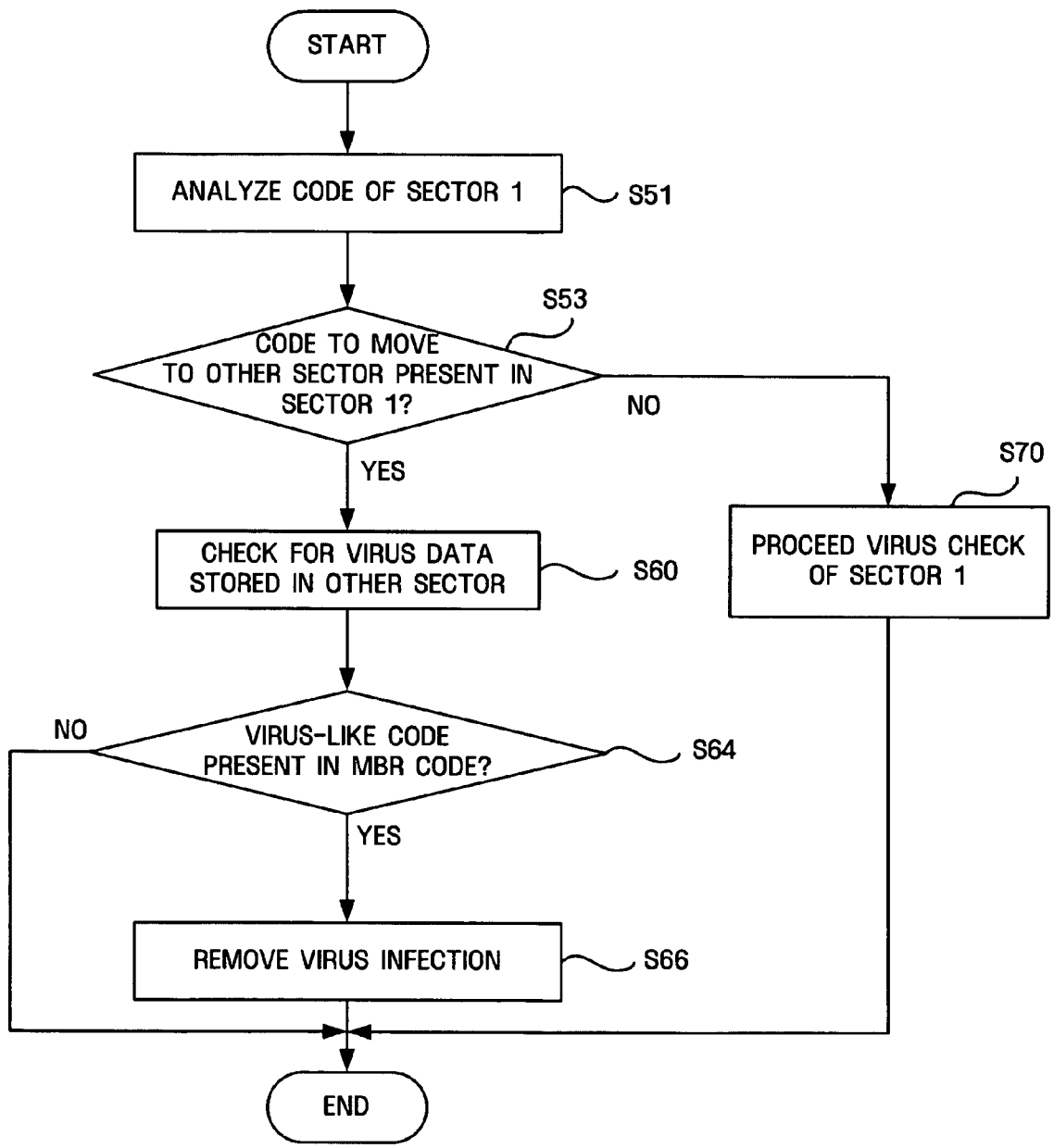
FIG. 6 is a flow chart illustrating checking of the MBR in an alternate location without using a separate storage space according to an embodiment of the present invention.

An operation of checking and repairing a virus infected MBR where the MBR is not stored in the CMOS storage, will be described. FIG. 6 is a flow chart showing a method of checking the MBR (i.e., where the MBR does not use a separate storage space) according to an embodiment of the present invention.

The virus check unit 200 analyzes the code of the first sector at operation S51. Based on the analysis result, the virus check unit 220 checks whether code is present that details that the MBR exists in a sector other than sector 1 at operation S53. Operations S51 and S53 may be conducted through interrupt handling. Reading out a specific section of the storage unit such as a hard disk is an example of movement to another sector. In addition, code instructing reading of the MBR code from another sector or device may be present; and when such code is present, the virus check unit 200 checks whether the MBR code stored in the concerned sector is infected with a virus at operation S60. If no virus is found at operation S64, the virus check is finished. If a virus is discovered, the virus is treated and then the virus check is finished at operation S66. Treatment of the virus includes deleting the virus and storing the original MBR code.

In operation S53, when code to move to a sector other than sector 1 is not present, the method proceeds with the virus checking of the MBR code stored in sector 1 at operation S70.

Figure 7:
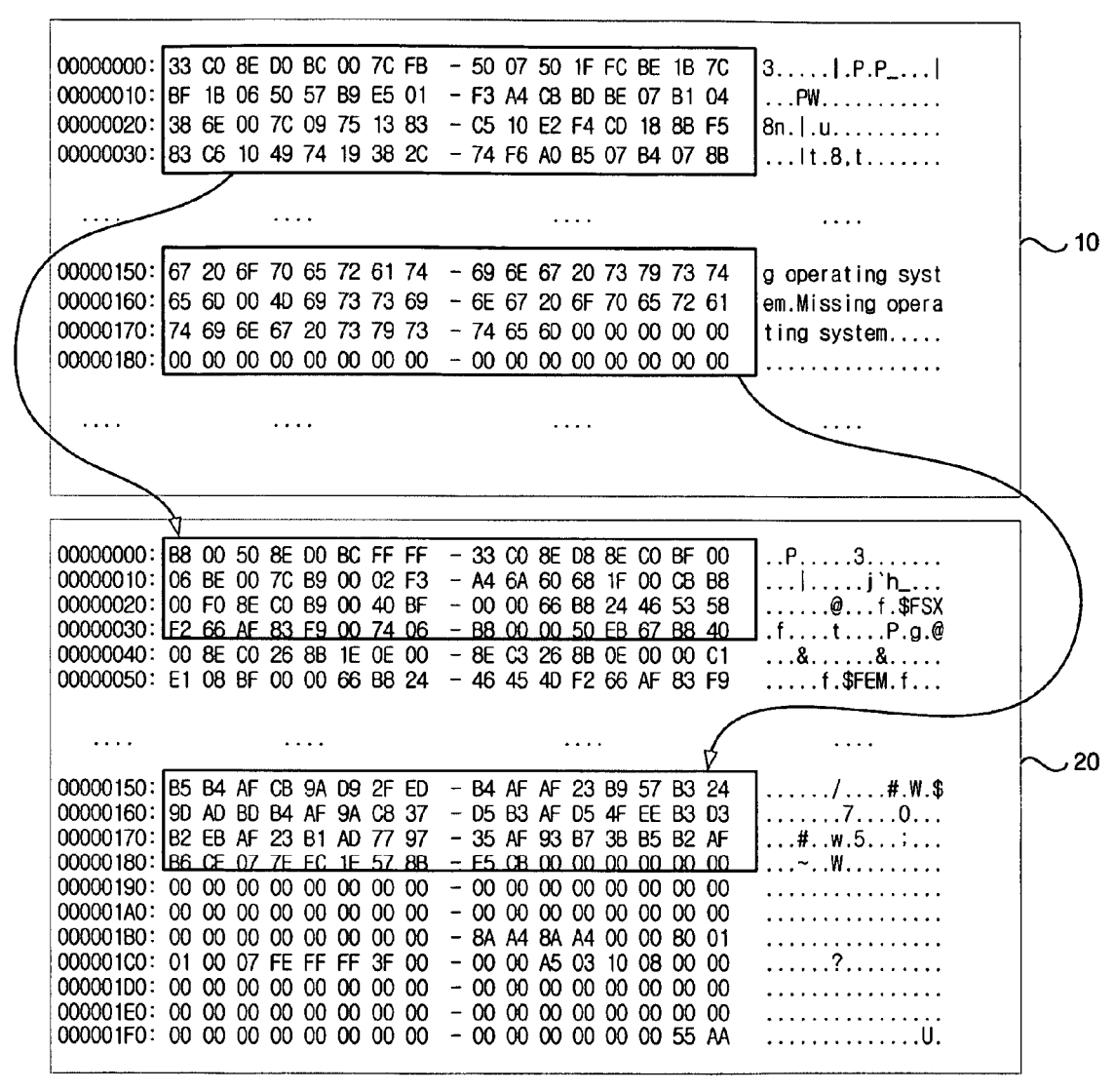

FIG. 7 illustrates the case where the code stored in sector 1 is different according to manufacturer. Two segments of code are stored in sector 1.

The first segment of code 10 shows that the MBR code is stored in sector 1 and the second segment of code 20 shows that the MBR code is not stored in sector 1. Comparing a specific area of the first segment of code 10 with a corresponding area of the second segment of code 20 indicates that respective bits stored therein are different. As described above, the second segment of code 20 stores information on another preprocessing operation, instead of the MBR code, and comprises code to move to another sector to read out the MBR. A part of the second segment of code 20 was inversely assembled and is represented in assembly language in FIG. 8.

The reference number "25" in FIG. 8 indicates the result of inversely assembling a part of the second segment of code 20 of FIG. 7, which includes a portion 28 for read from a hard disk, that is, "INT 13h." This code reads a specific position of the hard disk, which implies that data in the other sector reads from the first sector. Considering the movement addresses, this is an operation to store data in a specific register through an MOV command. MOV is an assembly command for storing a specific value in a register. In FIG. 8, a letter "h" after an alpha-numeric expression indicates that the alpha-numeric expression is a hexadecimal number.

A header number to read the hard disk is set through "MOV DH, 00h." Where there are two headers to read the hard disk from both sides; the header numbers are set to designate a header to be used. A drive number is set through "MOV DL, 80h." When two or more hard disks are used, the drive number is necessary to determine from which hard disk data is to be read. The cylinder number and the sector number are set through "MOV CX, 000Ch"; CX is divided into CH (8 bits) and CL (8 bits). Since CH is 00h, the cylinder number is set, and 0Ch of CL indicates the sector number. This is a preparatory operation to read data of the $12^{th}$ sector (0C in hexadecimal). The quantity of data to be read through the next command "MOV AX, 0201h" is set. AX is divided into AH (8 bits) and AL (8 bits)Here, AH stores the value 02h. AL determines the number of sectors to be read. Since at least one sector is to be read, the number is at least 1. Since 01h is assigned to AL, one sector is read. Since the MBR is stored in a sector, this is an operation to read out the MBR. Since the MBR code is stored in the $12^{th}$ sector, the code checks whether a virus is present in the code of the $12^{th}$ sector. When a virus is present, the virus is removed.

The machine code makes it easy to check code moved to another sector from the first sector ("INT 13h"). Accordingly, by finding and inversely tracing the concerned CD 13 code in sector 1, the sector in which the MBR code is stored can be easily found.

As a result of finding the sector storing the MBR and checking the concerned MBR code, when a virus is present in the MBR code, there is a need to remove it. It may employ a method of storing the MBR code again in the concerned sector through a USB port, a floppy diskette or others. To restore the MBR, the original MBR code stored in small storage areas such as EEPROM or CMOS, may be used to restore the MBR code infected with a virus.

According to the present invention, a virus can be checked and treated when the MBR is not stored in sector 1.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus comprising:
    a first storage unit having a plurality of sectors, and to store a master boot record in a storage position of the first storage unit; and
    a virus check unit to search for the master boot record within the first storage unit in order to determine whether the storage position of the master boot record is in a first sector or another sector of the first storage unit, to determine whether the master boot record is infected with a virus, and to restore the master boot record, if the master boot record is infected with the virus.

2. The apparatus of claim 1, wherein the virus check unit reads information on the storage position of the master boot record from the first storage unit or a second storage unit, and checks the read storage position for the master boot record.

3. The apparatus of claim 2, wherein the second storage unit is a storage medium to store items to be checked or setting information necessary when the apparatus begins to operate.

4. The apparatus of claim 2, wherein the second storage unit is a complementary metal-oxide-semiconductor (CMOS) storage.

5. The apparatus of claim 1, wherein the virus check unit determines whether code to read out data in a different sector from machine code stored in the first sector of the first storage unit is present, and checks the storage position of the master boot record.

6. The apparatus of claim 3, wherein the second storage unit is a storage medium set during manufacturing of the apparatus to store a same code as the master boot record of the first storage unit.

7. The apparatus of claim 6, wherein the virus check unit restores the master boot record in the first storage unit to the master boot record stored in the second storage unit when the master boot record in the first storage unit is infected with the virus.

8. The apparatus of claim 1, wherein the virus check unit resides in a basic input/output system (BIOS).

9. The apparatus of claim 1, wherein the virus check unit restores the master boot record via a network if the master boot record is infected with the virus.

10. A method of determining whether a master boot record stored in a storage position of a first storage unit having a plurality of sectors is infected with a virus and restoring the master boot record if infected, the method comprising:
    searching for the master boot record stored in the first storage unit in order to determine whether the storage position of the master boot record is in a first sector or another sector of the first storage unit;
    determining whether the master boot record in the searched storage position of the first storage unit is infected with the virus; and
    restoring the master boot record if the master boot record stored in the searched storage position is infected with the virus.

11. The method of claim 10, wherein the searching comprises:
    reading out information on the storage position where the master boot record is stored from the first storage unit or a second storage unit, and
    checking the storage position for the master boot record.

12. The method of claim 11, wherein:
    the second storage unit is a storage medium to store an item to be checked or to store setting information necessary when a computer including the first storage unit begins to operate.

13. The method of claim 11, wherein the second storage unit is a complementary metal-oxide-semiconductor (CMOS) storage.

14. The method of claim 10, wherein the searching comprises:
    determining whether code to read out data in a different sector from a machine code stored in the first sector of the first storage unit is present, and
    checking the storage position for the master boot record.

15. The method of claim 12, wherein the second storage unit is a storage medium that is set during manufacturing of the computer to store a same code as the master boot record of the first storage unit.

16. The method of claim 15, wherein the restoring comprises:
    restoring the master boot record of the first storage unit to a master boot record stored in the second storage unit when the master boot record in the first storage unit is infected with the virus.

17. The method of claim 10, wherein the restoring is conducted by a basic input/output system (BIOS).

18. The method of claim 10, wherein the restoring comprises:
    restoring the master boot record via a network.

19. A recording medium encoded with a computer readable program, which, when executed by a computer system having first and second storage units, performs a method comprising:
    searching for a master boot record stored in the first storage unit of the apparatus in order to determine whether a storage position of the master boot record is in a first sector or another sector of the first storage unit;
    determining whether the master boot record in the searched storage position of the first storage unit is infected with a virus; and
    restoring the master boot record if the master boot record is infected with the virus.

20. The recording medium of claim 19, wherein the searching comprises:
    reading out information on the storage position where the master boot record is stored from the first storage unit or the second storage unit, and
    checking the storage position for the master boot record.

21. The recording medium of claim 20, wherein the second storage unit is a storage medium to store items to be checked or to store setting information necessary when the computer system begins to operate.

22. The recording medium of claim 20, wherein the second storage unit is a complementary metal-oxide-semiconductor (CMOS) storage.

23. The recording medium of claim 19, wherein the searching comprises:
   determining whether code to read out data in a different sector from the machine code stored in the first sector of the first storage unit is present, and
   checking the storage position for the master boot record.

24. The recording medium of claim 20, wherein the second storage unit is a storage medium to store a same code as code of the master boot record of the first storage unit.

25. The recording medium of claim 24, wherein restoring comprises:
   restoring the master boot record in the first storage unit to the master boot record stored in the second storage unit when the master boot record in the first storage unit is infected with the virus.

26. The recording medium of claim 19, wherein the restoring comprises:
   restoring the master boot record by a basic input/output system (BIOS).

27. The recording medium of claim 19, wherein the restoring comprises:
   restoring the master boot record via a network.

28. A method of operating a computer system, the method comprising:
   storing a master boot record in a first portion of a storage medium which is not accessed when initializing the computer system;
   storing location information of the master boot record in a second portion of the storage medium which is accessed when initializing the computer system;
   reading the master boot record from the first portion of the storage medium according to the location information stored in the second portion of the storage medium;
   determining whether the read master boot record from the first portion of the storage medium is infected by a virus;
   overwriting the infected master boot record in the first portion of the storage medium with an original master boot if the virus is found to have infected the read master boot record.

29. The method of claim 28, wherein the original master boot record is stored on a network.

30. The method of claim 28, wherein the original master boot record is stored in another storage medium of the computer system.

31. The method of claim 30, wherein the another storage medium is a read only storage medium.

* * * * *

UNITED STATES PATENT AND TRADEMARK OFFICE
CERTIFICATE OF CORRECTION

PATENT NO. : 7,565,523 B2
APPLICATION NO. : 11/402991
DATED : July 21, 2009
INVENTOR(S) : Kyu-in Han Page 1 of 1

It is certified that error appears in the above-identified patent and that said Letters Patent is hereby corrected as shown below:

Column 9, line 13, insert --the-- after "wherein".

Signed and Sealed this

Tenth Day of November, 2009

David J. Kappos
*Director of the United States Patent and Trademark Office*